(12) United States Patent
Bilgrien et al.

(10) Patent No.: US 6,677,407 B1
(45) Date of Patent: Jan. 13, 2004

(54) COATING WITH ORGANOPOLYSILOXANE, ORGANOHYDROGENSILICON, PLATINUM CATALYST AND SILYLATED ACETYLENIC COMPOUND

(75) Inventors: Carl Joseph Bilgrien, Midland, MI (US); Shawn Keith Mealey, Midland, MI (US); Michael Ward Skinner, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 08/704,063

(22) Filed: Aug. 28, 1996

(51) Int. Cl.$^7$ .................. C08G 77/08; C08G 77/12; C08L 83/05; B05D 3/02
(52) U.S. Cl. .................. 525/478; 528/15; 528/31; 524/588; 427/387; 428/447
(58) Field of Search .................. 528/15, 31; 525/478; 524/588; 556/482; 427/387; 428/447

(56) References Cited

U.S. PATENT DOCUMENTS

| | | | |
|---|---|---|---|
| 2,823,218 A | 2/1958 | Speier et al. | 260/448.2 |
| 3,419,593 A | 12/1968 | Willing | 260/448.2 |
| 3,445,420 A | 5/1969 | Kookootsedes et al. | 260/37 |
| 4,032,502 A | 6/1977 | Lee et al. | 260/37 |
| 4,154,714 A | 5/1979 | Hockemeyer et al. | 260/31.2 R |
| 4,465,818 A | 8/1984 | Shirahata et al. | 528/12 |
| 4,472,562 A | 9/1984 | Shirahata | 528/15 |
| 4,472,563 A | 9/1984 | Chandra et al. | 528/15 |
| 4,559,396 A | 12/1985 | Sasaki et al. | 528/15 |
| 4,609,574 A | * 9/1986 | Keryk et al. | 528/15 |
| 4,726,964 A | * 2/1988 | Isobe et al. | 427/54.1 |
| 4,839,452 A | * 6/1989 | Kurita et al. | 528/15 |
| 4,972,001 A | * 11/1990 | Kimura et al. | 521/77 |
| 5,082,894 A | 1/1992 | VanWert et al. | 524/730 |
| 5,100,990 A | * 3/1992 | Irifune et al. | 528/15 |
| 5,210,126 A | 5/1993 | Ushio et al. | 524/588 |
| 5,270,425 A | 12/1993 | VanWert et al. | 528/15 |
| 5,449,802 A | 9/1995 | Bank et al. | 556/479 |

FOREIGN PATENT DOCUMENTS

| | | |
|---|---|---|
| JP | 4431476 | 12/1969 |
| JP | 1-12786 | * 3/1989 |
| JP | 4-359963 | * 12/1992 |
| JP | 6-256659 | * 9/1994 |

OTHER PUBLICATIONS

CAPLUS accession No. 1990:461033, Hara et al., "Retardation effect by acetylene derivatives on hydrosilylation. Estimation of the retarder's capability by differential thermal analysis method," Nippon Kagaku Kaishi, vol. 5, pp. 541–546, 1990.*

* cited by examiner

*Primary Examiner*—Robert E. L. Sellers

(57) ABSTRACT

The present invention relates to a method of making silicone release coating compositions comprising mixing a vinyl functional organopolysiloxane, an organohydrogensilicon compound, a platinum group metal-containing catalyst, and certain silylated acetylenic inhibitors. The present invention further relates to a method of making silicone release coating compositions comprising mixing an organopolysiloxane compound having alkenyl groups which contain at least four carbon atoms, an organohydrogensilicon compound, a platinum group metal-containing catalyst, and a silylated acetylenic compound having its formula selected from the group consisting of: $HC{\equiv}C{-}Q{-}O{-}Si{-}(R^3)_3$, $HC{\equiv}C{-}Q{-}O{-}Si(R^3)_2{-}O{-}Q{-}C{\equiv}CH$, and $H{-}Si{-}(O{-}Q{-}C{\equiv}CH)_3$ where $R^3$ is independently selected from the group consisting of hydrogen, monovalent hydrocarbon radicals free of aliphatic unsaturation, and an alkenyl group, and Q is a divalent hydrocarbon radical at least 3 carbon atoms, with the proviso that there is at most one silicon-bonded hydrogen group or one silicon-bonded alkenyl group per silylated acetylenic compound.

12 Claims, No Drawings

COATING WITH ORGANOPOLYSILOXANE, ORGANOHYDROGENSILICON, PLATINUM CATALYST AND SILYLATED ACETYLENIC COMPOUND

BACKGROUND OF THE INVENTION

The present invention relates to silicone release coatings which cure at low temperatures. More particularly, the present invention relates to curable silicone release coatings which contain certain silylated acetylenic inhibitors.

Acetylenic compounds which are suitable as inhibitors in curable silicone coating compositions have been disclosed. For example, Shirahata et al. in U.S. Pat. No. 4,465,818 discloses organopolysiloxane compositions, which react by way of a hydrosilylation reaction to undergo an increase in viscosity, and have longer pot life and/or shorter cure time than analogous compositions in the art by incorporating therein an unsaturated hydrocarbon having from 6 to 10 carbon atoms, a terminal acetylenic linkage, and an olefinic linkage conjugated therewith. Chandra et al. in U.S. Pat. No. 4,472,563 discloses improved inhibitors for the reaction of silicon hydride containing silicones with vinyl or hydroxyl containing silicones, the inhibitors being mixtures of conjugated ene-ynes and vinylcyclosiloxanes. Sasaki et al. in U.S. Pat. No. 4,559,396 discloses room temperature storable, heat-curable organopolysiloxane compositions which comprise silicon-bonded vinyl radicals, silicon-bonded hydrogen atoms, a platinum-type compound and an unsaturated hydrocarbon compound of the conjugated ene-yne type provide a release surface for tacky substances when coated onto the surface of a base material and heated. VanWert et al. in U.S. Pat. No. 5,082,894 discloses a one-part organosiloxane composition that cures by platinum catalyzed hydrosilylation which contains an acetylenic alcohol containing at least 8 carbon atoms such as 3,5-dimethyl-1-hexyn-3-ol as the catalyst inhibitor. Ushio et al. in U.S. Pat. No. 5,210,126 discloses a silicone rubber composition prepared by mixing a diorganopolysiloxane which contains 0.1 to 5 percent of a low molecular weight organosiloxane with a vapor pressure at 200° C. of at least 10 mm Hg, with at least 90 weight percent of a low-molecular-weight organosiloxane with a boiling point not exceeding 250° C. at 760 mm Hg and a curing agent, which can further contain a curing retarder such as 3-methyl-1-butyn-3-ol, 3,5-dimethyl-1-hexyn-3-ol, 3-methyl-3-pentene-1-yne, 3,5-dimethyl-3-hexene-1-yne, and methylvinylsiloxane cyclics.

VanWert et al. in U.S. Pat. No. 5,270,425 discloses one part organosiloxane compositions comprising a vinyltrialkoxysilane, an epoxy-substituted alkoxysilane, a vinyl-containing hydroxylated polyorganosiloxane, a chelated aluminum compound, and an inhibitor composition comprising a mixture of at least one cyclic methylvinylsiloxane and an acetylenic alcohol containing at least 6 carbon atoms.

Silicone coatings which contain silylated acetylenic inhibitors have been disclosed. For example, Kookootsedes et al. in U.S. Pat. No. 3,445,420 discloses a curable composition which can be stored in the presence of a catalyst but cures by heating or exposure to the atmosphere is a mixture of an olefin containing organosilicon polymer, an organosilicon compound containing silicon-bonded hydrogen atoms, a platinum catalyst, and an acetylenic compound such as $C_6H_5Si(OCH_2C\equiv CH)_3$, $C_6H_5Si(CH_3)(OCH(CH_3)C\equiv CH)_2$, or $(HC\equiv CSi(CH_3)_2)O$.

Lee et al. in U.S. Pat. No. 4,032,502 discloses organopolysiloxane compositions for use in a liquid injection molding process are produced by mixing a vinyl-endblocked polydiorganosiloxane fluid copolymer, a treated reinforcing silica filler, a platinum containing catalyst, a dimethylhydrogensiloxane curing agent, and acetylenic silanes as an inhibitor for the catalyst. The acetylenic silanes are disclosed as being of the formulae $R''_vSi(OC(CH_3)_2C\equiv CH)_{4-v}$ or

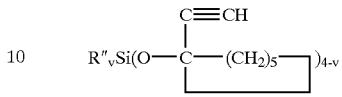

where R" is independently methyl, ethyl, phenyl, or 3,3,3-trifluoropropyl and v is an integer from 0 to 2 inclusive. Shirahata in U.S. Pat. No. 4,472,562 discloses heat curable polyorganosiloxane compositions comprising a vinyl containing polyorganosiloxane, a polyorganosiloxane containing silicon-bonded hydrogen atoms, a platinum, palladium, or rhodium catalyst, and specified acetylenic silanes as storage stabilizers. The silanes are of the general formula $R^4Si(OCR^5R^6C\equiv CH)_3$ where $R^4$, $R^5$, and $R^6$ are identical or different monovalent hydrocarbon radicals containing from 1 to 10 carbon atoms, or $R^5$ and $R^6$ jointly form a divalent hydrocarbon radical.

Japanese Pat. Publication No. 1-12786 (12,786/1989) discloses a silicone composition for mold-release paper, composed of (1) 100 parts by weight of an organopolysiloxane that has a viscosity of 50 centistokes or greater at 25° C., contains at least two bonds between a vinyl group and a silicon atom in each molecule and has an essentially linear structure, (2) 0.2 to 50 parts by weight of an organopolysiloxane having at least two bonds between hydrogen atoms and silicon atoms in each molecule, (3) 2–500 ppm of a platinum compound in terms of metallic platinum with respect to component (1) indicated above, and (4) 0.1 to 10 parts by weight of an organosilicon compound having the general formula

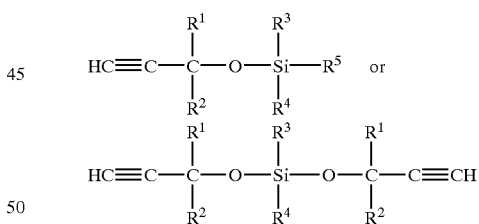

wherein $R^1$, $R^2$, $R^3$, $R^4$, and $R^5$ denote hydrogen atoms or the same or different substituted or unsubstituted aliphatic monovalent hydrocarbon groups having 1 to 10 carbon atoms that has a boiling point of 250° C. or less and has acetylenic unsaturated groups that are compatible with the aforementioned first or second organopolysiloxane components. Examples of the specific compounds disclosed include

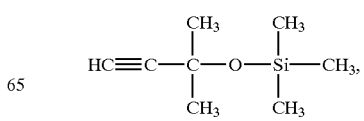

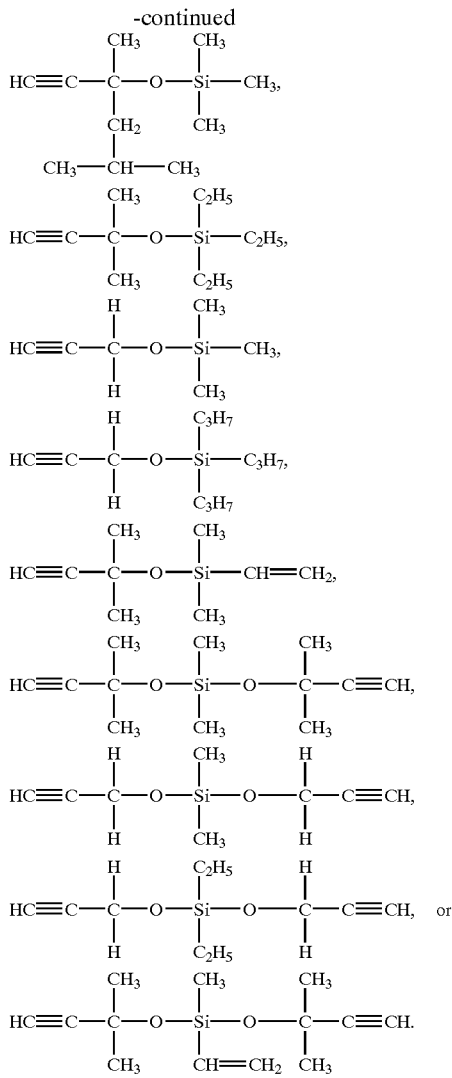

However, nowhere in the above Japanese Pat. Publication are these types of silylated acetylenic inhibitors disclosed in combination with higher alkenyl containing organopolysiloxane polymers.

SUMMARY OF THE INVENTION

The present invention relates to a method of making silicone release coating compositions comprising mixing a vinyl functional organopolysiloxane, an organohydrogensilicon compound, a platinum group metal-containing catalyst, and certain silylated acetylenic inhibitors.

The present invention further relates to a method of making silicone release coating compositions comprising mixing an organopolysiloxane compound having alkenyl groups which contain at least four carbon atoms, an organohydrogensilicon compound, a platinum group metal-containing catalyst, and silylated inhibitors.

It is an object of the present invention to produce silicone release coatings which cure quickly at low temperatures.

It is a further object of this invention to produce silicone release coatings which can be coated on heat sensitive substrates.

DETAILED DESCRIPTION OF THE INVENTION

The first embodiment of the present invention relates to a method of making a curable silicone release coating composition comprising (I) mixing (A) an organopolysiloxane compound having its formula selected from the group consisting of (i) $R^1{}_3SiO(R_2SiO)_x(RR^1SiO)_ySiR^1{}_3$, (ii) $R^1{}_3SiO(R_2SiO)_xSiR^1{}_3$, and (iii) $R^1{}_3SiO(RR^1SiO)_ySiR^1{}_3$, wherein R is independently selected from monovalent hydrocarbon or halohydrocarbon radicals free of aliphatic unsaturation and having from 1 to 20 carbon atoms, $R^1$ is independently selected from the group consisting of R and vinyl, x has a value of from greater than zero to 7000, and y has a value of from greater than zero to 350 with the proviso that there are at least two vinyl groups per compound, (B) an organohydrogensilicon compound, (C) a platinum group metal-containing catalyst, (D) a silylated acetylenic compound having its formula selected from the group consisting of:

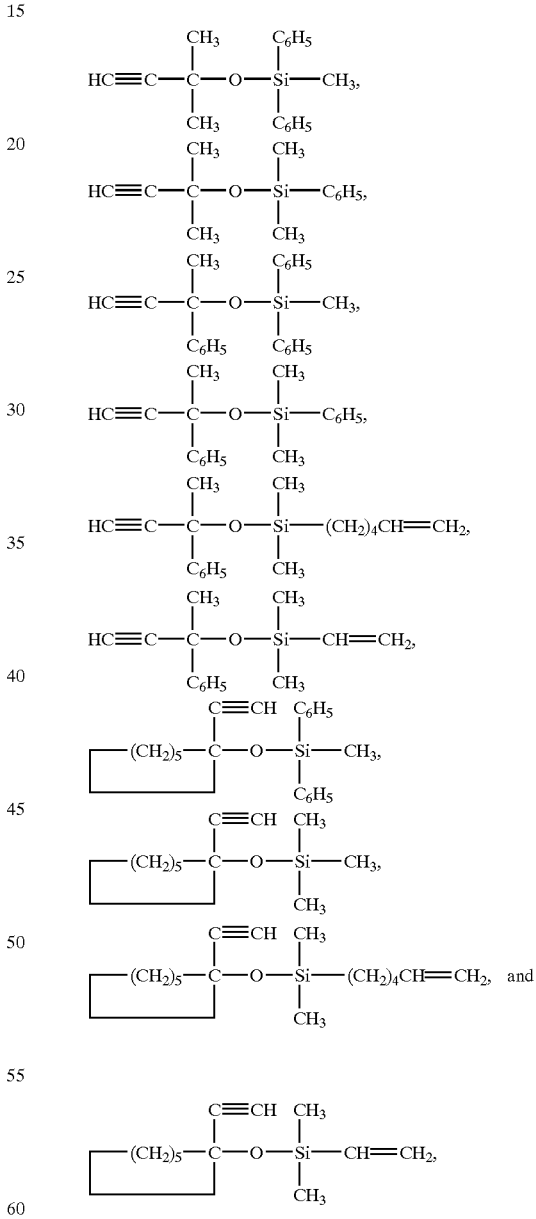

and optionally (E) a diluent.

The monovalent radicals of R in compound (A) can contain up to 20 carbon atoms and include hydrocarbon or halohydrocarbon radicals free of aliphatic unsaturation. Monovalent hydrocarbon radicals free of aliphatic unsaturation include alkyl radicals such as methyl, ethyl, propyl, butyl, hexyl, octyl, and decyl, cycloaliphatic radicals such as cyclohexyl, aryl radicals such as phenyl, tolyl, and xylyl, and aralkyl radicals such as benzyl and phenylethyl. Highly preferred monovalent hydrocarbon radicals for R are methyl and phenyl. Monovalent halohydrocarbon radicals free of aliphatic unsaturation include any monovalent hydrocarbon radical noted above which is free of aliphatic unsaturation and has at least one of its hydrogen atoms replaced with a halogen, such as fluorine, chlorine, or bromine. Preferred monovalent halohydrocarbon radicals have the formula $C_nF_{2n+1}CH_2CH_2$— wherein the subscript n has a value of from 1 to 10, such as, for example, $CF_3CH_2CH_2$— and $C_4F_9CH_2CH_2$—. The several R radicals can be identical or different, as desired, and preferably at least 50 percent of all R radicals are methyl.

Component (A) is preferably selected from the group consisting of $ViMe_2SiO(Me_2SiO)_xSiMe_2Vi$, $Me_3SiO(Me_2SiO)_x(MeViSiO)_ySiMe_3$, $Me_3SiO(MeViSiO)_ySiMe_3$, $ViMe_2SiO(Me_2SiO)_x(MeViSiO)_ySiMe_2Vi$, and $ViMe_2SiO(MeViSiO)_ySiMe_2Vi$ wherein Me and Vi denote methyl and vinyl, respectively, and x has a value of from greater than zero to 7000, and y has a value of from greater than zero to 350. The value of the subscripts x and y above are such that the organopolysiloxane compound of Component (A) has a viscosity at 25° C. of at least 25 millipascal-seconds (mPa·s). Preferably x has a value of from 10 to 200, and y has a value of from 1 to 10.

The vinyl-functional organopolysiloxanes of Component (A) are well known in the art, many of these being available commercially, and further description thereof is considered unnecessary.

Component (B) is an organohydrogensilicon compound. Component (B) is preferably an organohydrogensilicon compound which is free of aliphatic unsaturation and contains two or more silicon atoms linked by divalent radicals, an average of from one to two silicon-bonded monovalent radicals per silicon atom and an average of at least one, and preferably two, three or more silicon-bonded hydrogen atoms per compound. Preferably the organohydrogensiloxane (B) contains an average of three or more silicon-bonded hydrogen atoms such as, for example, 5, 10, 20, 40, 70, 100, or more. The organohydrogensiloxane compounds suitable as Component (B) can be linear, branched, cyclic, and combinations thereof.

Examples of organopolysiloxanes which are suitable as component (B) include $HMe_2SiO(Me_2SiO)_cSiMe_2H$, $(HMe_2SiO)_4Si$, cyclo-$(MeHSiO)_c$, $(CF_3CH_2CH_2)MeHSiO\{Me(CF_3CH_2CH_2)SiO\}_cSiHMe(CH_2CH_2CF_3)$, $Me_3SiO(MeHSiO)_cSiMe_3$, $HMe_2SiO(Me_2SiO)_{0.5c}(MeHSiO)_{0.5c}SiMe_2H$, $HMe_2SiO(Me_2SiO)_{0.5c}(MePhSiO)_{0.1c}(MeHSiO)_{0.4c}SiMe_2H$, $Me_3SiO(Me_2SiO)_{0.3c}(MeHSiO)_{0.7c}SiMe_3$ and $MeSi(OSiMe_2H)_3$ where c has a value of from about 0 to about 1000.

Especially preferred as Component (B) are methylhydrogensiloxanes selected from the group consisting of bis(trimethylsiloxy)dimethyldihydrogendisiloxane, heptamethylhydrogentrisiloxane, hexamethyldihydrogentrisiloxane, methylhydrogencyclosiloxanes, pentamethylpentahydrogencyclopentasiloxane, pentamethylhydrogendisiloxane, polymethylhydrogensiloxanes, tetramethyltetrahydrogencyclotetrasiloxane, tetramethyldihydrogendisiloxane, and methylhydrogensiloxane-dimethylsiloxane copolymers. The disclosure of U.S. Pat. No. 4,154,714, incorporated herein by reference, shows preferred organohydrogenpolysiloxanes.

It is particularly preferred that component (B) is a compound having its formula selected from the group consisting of $HMe_2SiO(Me_2SiO)_a(MeHSiO)_bSiMe_2H$, $HMe_2SiO(Me_2SiO)_aSiMe_2H$, $Me_3SiO(Me_2SiO)_a(MeHSiO)_bSiMe_3$, $HMe_2SiO(MeHSiO)_bSiMe_2H$, and $Me_3SiO(MeHSiO)_bSiMe_3$ wherein Me denotes methyl wherein a has a value of from greater than zero to 1000 and b has a value of from greater than zero to 200.

The organohydrogensiloxanes of Component (B) are well known in the art, many of these being available commercially, and further description thereof is considered unnecessary.

It is preferred that from 0.5 to 90 parts by weight of Component (B) be used, and it is highly preferred that from 1 to 10 parts by weight of Component (B) be employed per 100 parts by weight of Component (A).

Component (C) is any platinum group metal-containing catalyst component which facilitates the reaction of the silicon-bonded hydrogen atoms of Component (B) with the silicon-bonded vinyl radicals of Component (A). By platinum group it is meant herein ruthenium, rhodium, palladium, osmium, iridium and platinum.

Component (C) is preferably a platinum containing catalyst component since they are the most widely used and available and because they provide a more favorable effect for the compositions of this invention in terms of improved release force. Platinum-containing catalysts can be a compound or complex of a platinum group metal. A preferred platinum-containing catalyst component in the compositions of this invention is a form of chloroplatinic acid, either as the commonly available hexahydrate form or as the anhydrous form, as taught by Speier, U.S. Pat. No. 2,823,218, incorporated herein by reference. A particularly useful catalyst is the composition that is obtained when chloroplatinic acid is reacted with an aliphatically unsaturated organosilicon compound such as divinyltetramethyldisiloxane, as disclosed by Willing, U.S. Pat. No. 3,419,593, incorporated herein by reference, because of its easy dispersibility in organosilicon systems.

The platinum catalysts of Component (C) are well known in the art, many of these being available commercially, and further description thereof is considered unnecessary.

The amount of platinum group metal-containing catalyst component that is used is not narrowly limited as long as there is a sufficient amount to accelerate a room temperature reaction between the silicon-bonded hydrogen atoms of Component (B) with the vinyl radicals of Component (A) and not so much as to make its action uncontrollable by the use of an inhibitor. The exact necessary amount of this catalyst component will depend on the particular catalyst utilized and is not easily predictable. However, for platinum containing catalysts the amount can be as low as one part by weight of platinum for every one million parts by weight of Component (A). Component (C) is preferably added at an amount of 10 to 10,000 parts for every one million parts of (A), and it is highly preferred that the amount is at 50 to 250 parts by weight of platinum for every one million parts by weight of (A).

Component (D) in the first embodiment of this invention is the specifically delineated silylated acetylenic inhibitors described hereinabove. The silylated acetylenic inhibitors of Component (D) were prepared by reacting chlorosilanes with acetylenic alcohols in the presence of an acid receptor such as picoline or pyridine.

The amount of inhibitor depends on the type of inhibitor used, and depends on the type and amount of platinum catalyst (C) used. However, it is preferred that from 0.1 to 10 parts by weight of Component (D) be used, and it is highly preferred that from 0.5 to 5 parts by weight of Component (D) be employed per 100 parts by weight of Component (A).

The optional diluents (E) are exemplified by aliphatic hydrocarbons such as pentane, hexane, heptane, octane, nonane, and the like; aromatic hydrocarbons such as benzene, toluene, and xylene; ketones such as acetone, methylethyl ketone, and methylisobutyl ketone, and halogenated diluents such as fluorine-, chlorine-, and bromine-, substituted aliphatic or aromatic hydrocarbons such as trichloroethane, perchloroethylene, bromobenzene, and the like. Two or more diluents may be used together.

The amount of diluent is not critical and may be readily determined by one skilled in the art. The compositions of this invention may contain up to 10,000 parts by weight of diluent, however it is preferred that from about 500 to 2000 parts by weight be employed per 100 parts by weight of Component (A).

The present invention further relates to a curable silicone release coating composition comprising a reaction product of components (A), (B), (C), (D), and optionally (E) described hereinabove. Components (A)–(E) are as described above including preferred embodiments thereof.

A second embodiment of the present invention relates to a method of making a curable silicone release coating composition comprising (I) mixing (A') an organopolysiloxane compound having its formula selected from the group consisting of: (i) $R^2{}_3SiO(R_2SiO)_x(RR^2SiO)_ySiR^2{}_3$, (ii) $R^2{}_3SiO(R_2SiO)_xSiR^2{}_3$, and (iii) $R^2{}_3SiO(RR^2SiO)_ySiR^2{}_3$, wherein R is independently selected from monovalent hydrocarbon or halohydrocarbon radicals free of aliphatic unsaturation and having from 1 to 20 carbon atoms, $R^2$ is independently selected from the group consisting of R and an alkenyl group having at least four carbon atoms, x has a value of from greater than zero to 7000, and y has a value of from greater than zero to 350 with the proviso that there are at least two alkenyl groups having at least 4 carbon atoms per compound, (B') an organohydrogensilicon compound, (C') a platinum group metal-containing catalyst, (D') a silylated acetylenic compound having its formula selected from the group consisting of:

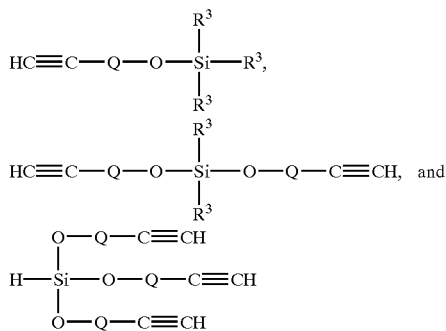

wherein $R^3$ is independently selected from the group consisting of hydrogen, a monovalent hydrocarbon or halohydrocarbon radical having from 1 to 20 carbon atoms and free of aliphatic unsaturation, and an alkenyl group, and Q is a divalent hydrocarbon radical having at least 3 carbon atoms, with the proviso that there is at most one silicon-bonded hydrogen group or one silicon-bonded alkenyl group per silylated acetylenic compound, and optionally (E') a diluent.

The monovalent hydrocarbon or halohydrocarbon radicals which are free of aliphatic unsaturation of R in Component (A') are as described hereinabove in the first embodiment of this invention including preferred embodiments thereof. It is preferred that R is methyl or phenyl.

The group $R^2$ in component (A') is preferably independently selected from the group consisting of methyl and an alkenyl group having the formula $-(CH_2)_mCH=CH_2$ or $-(CH_2)_nCH=CH-(CH_2)_pCH=CH_2$ wherein m has a value of 2 to 20, n has the value of 0 to 9, and p has the value of 3, 4, or 5. It is highly preferred that $R^2$ is independently selected from the group consisting of methyl, 3-butenyl, 4-pentenyl, 5-hexenyl, 6-heptenyl, 7-octenyl, 8-nonenyl, 9-decenyl, 10-undecenyl, 4,7-octadienyl, 5,8-nonadienyl, 5,9-decadienyl, 6,11-dodecadienyl, and 4,8-nonadienyl. The disclosure of U.S. Pat. No. 4,609,574, incorporated herein by reference, shows highly-preferred higher alkenyl functional organopolysiloxanes.

It is highly preferred that component (A') is an organopolysiloxane compound having its formula selected from the group consisting of $HexMe_2SiO(Me_2SiO)_xSiMe_2Hex$, $Me_3SiO(Me_2SiO)_x(MeHexSiO)_ySiMe_3$, $Me_3SiO(MeHexSiO)_ySiMe_3$, $HexMe_2SiO(Me_2SiO)_x(MeHexSiO)_ySiMe_2Hex$, and $HexMe_2SiO(MeHexSiO)_ySiMe_2Hex$ wherein Me and Hex denote methyl and 5-hexenyl, respectively, x has a value of from greater than zero to 7000, and y has a value of from greater than zero to 350.

The organohydrogensilicon compound of Component (B') is as delineated above for Component (B) including preferred amounts and embodiments thereof. It is highly preferred that Component (B') is a compound having its formula selected from the group consisting of $HMe_2SiO(Me_2SiO)_a(MeHSiO)_bSiMe_2H$, $HMe_2SiO(Me_2SiO)_aSiMe_2H$, $Me_3SiO(Me_2SiO)_a(MeHSiO)_bSiMe_3$, $HMe_2SiO(MeHSiO)_bSiMe_2H$, and $Me_3SiO(MeHSiO)_bSiMe_3$ wherein Me denotes methyl wherein a has a value of from greater than zero to 1000 and b has a value of from greater than zero to 200.

The platinum group metal-containing catalyst of Component (C') is as delineated above for Component (C) including preferred amounts and embodiments thereof. It is highly preferred that Component (C') is selected from chloroplatinic acid or chloroplatinic acid-divinyltetramethyldisiloxane complexes.

The monovalent radicals of $R^3$ in compound (D') can contain up to 20 carbon atoms and include hydrocarbon or halohydrocarbon radicals free of aliphatic unsaturation. Monovalent hydrocarbon radicals free of aliphatic unsaturation include alkyl radicals such as methyl, ethyl, propyl, butyl, hexyl, octyl, and decyl, cycloaliphatic radicals such as cyclobutyl, cyclopentyl, cyclohexyl, cyclo-octyl, or cycloheptyl, aryl radicals such as phenyl, tolyl, and xylyl, and aralkyl radicals such as benzyl and phenylethyl. Monovalent halohydrocarbon radicals free of aliphatic unsaturation include any monovalent hydrocarbon radical noted above which is free of aliphatic unsaturation and has at least one of its hydrogen atoms replaced with a halogen, such as fluorine, chlorine, or bromine. Preferred monovalent halohydrocarbon radicals have the formula $C_nF_{2n+1}CH_2CH_2-$ wherein the subscript n has a value of from 1 to 10, such as, for example, $CF_3CH_2CH_2-$ and $C_4F_9CH_2CH_2-$.

The alkenyl groups of $R^3$ in Component (D') preferably have from 2 to 20 carbon atoms and include alkenyl groups having the formula $-(CH_2)_mCH=CH_2$ or $-(CH_2)_nCH=CH-(CH_2)_pCH=CH_2$ wherein m has a value of 0 to 20, n has the value of 0 to 9, and p has the value of 3, 4, or 5. It is highly preferred that $R^3$ is independently selected from the group consisting of vinyl, allyl, propenyl, butenyl, pentenyl, 5-hexenyl, 6-heptenyl, 7-octenyl, 8-nonenyl, 9-decenyl, 10-undecenyl, 4,7-octadienyl, 5,8-nonadienyl, 5,9-decadienyl, 6,11-dodecadienyl, and 4,8-nonadienyl. It is preferred that $R^3$ in Component (D') of the second embodiment of this invention is independently selected from the group consisting of hydrogen, methyl, ethyl, phenyl, vinyl, 5-hexenyl, and —$CH_2CH_2C_nF_{2n+1}$ where n has a value of 1 to 10.

The divalent hydrocarbon radicals of Q have at least 3 carbon atoms and include groups such as —$CR^4R^5$— wherein $R^4$ and $R^5$ are each monovalent hydrocarbon or halohydrocarbon radicals having from 1 to 20 carbon atoms, as described hereinabove for R. Preferably $R^4$ and $R^5$ are independently selected from the group consisting of methyl, ethyl, propyl, butyl, isopropyl, isobutyl, hexyl, and phenyl. The groups $R^4$ and $R^5$ together can also form cycloaliphatic radicals such as cyclobutyl, cyclopentyl, cyclohexyl, cyclo-octyl, or cycloheptyl. Preferably Q is selected from the group consisting of —$C(CH_3)_2$—, —$C(CH_3)(CH_2CH(CH_3)_2)$—, —$C(CH_3)(C_6H_5)$—, and

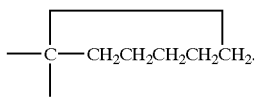

Preferably Component (D') is a compound having its formula selected from the group consisting of

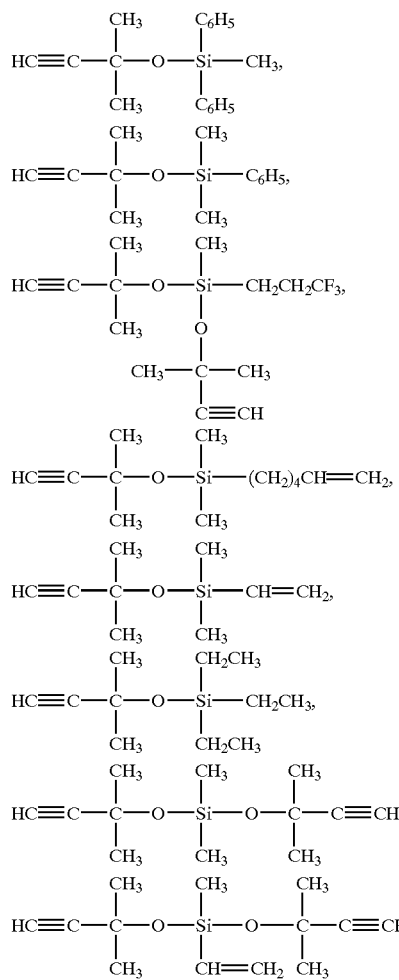

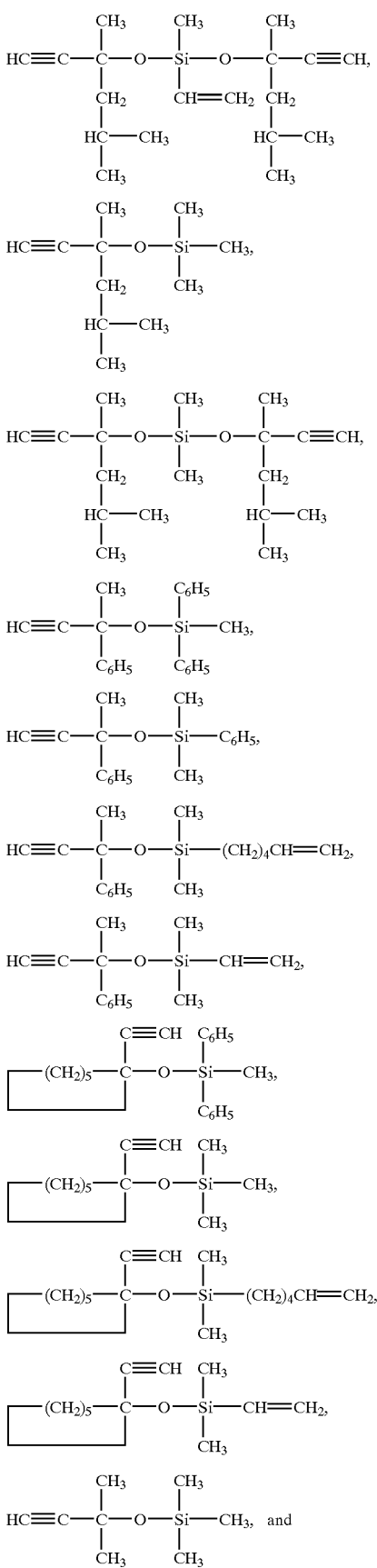

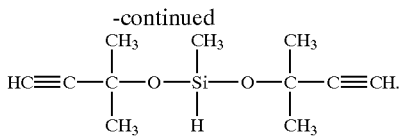

The silylated acetylenic inhibitors of Component (D') were prepared by reacting chlorosilanes with acetylenic alcohols in the presence of an acid receptor such as picoline or pyridine.

The amount of inhibitor depends on the type of inhibitor used, and depends on the type and amount of platinum catalyst (C') used. It is preferred that from 0.01 to 10 parts by weight of Component (D') be used, and it is highly preferred that from 0.1 to 5 parts by weight of Component (D') be employed per 100 parts by weight of Component (A').

The optional diluent (E') is as described above in the first embodiment of this invention including preferred embodiments and amounts thereof.

The compositions of this invention can be prepared by homogeneously mixing Components (A–D) or (A'–D') and any optional components in any order, using any suitable mixing means, such as a spatula, a drum roller, a mechanical stirrer, a three-roll mill, a sigma blade mixer, a bread dough mixer, and a two-roll mill. The order of mixing Components (A–D) or (A'–D') and any optional components is not critical, however, it is highly preferred that Components (A/A') and (B/B') be mixed together in a preliminary mixing step, next adding Component (D/D'), and then adding Component (C/C'), or mixing components (A/A') and (C/C'), and mixing (B/B') and (D/D') in a preliminary mixing step, and then combining those two mixtures in a final mixing step. It is especially preferred that Components (B/B') and (C/C') be kept separate, and additionally Components (C/C') and (D/D') be kept separate during the preparation of the silicone release coating until the final mixing step.

The compositions of this invention can contain any optional components commonly used in platinum group metal catalyzed organosilicon compositions, such as reinforcing and extending fillers, hydrocarbons and halohydrocarbons free of aliphatic unsaturation, colorants, stabilizers, adhesion modifiers, adhesive-release modifiers, etc. In particular, the coating compositions of this invention which have adhesive-releasing properties can further comprise the well-known high release additives of the art.

The compositions of this invention have utility as formable compositions to provide organosilicon articles such as O-rings, tubing, wire-coating, gaskets, encapsulant and sealant compositions, and as coating compositions. The compositions of the present invention have particular utility as release coatings.

The present invention further relates to a curable silicone release coating composition comprising a reaction product of components (A'), (B'), (C'), (D'), and optionally (E'). Components (A')–(E') are as described above including preferred embodiments thereof.

In another aspect the present invention relates to a coated article prepared by a method comprising (I) applying a curable silicone coating composition on the surface of a substrate wherein the composition is prepared by mixing components (A–D and optionally E) or (A'–D' and optionally E'), and (II) exposing the coating and substrate to an energy source selected from the group consisting of (i) heat and (ii) actinic radiation in an amount sufficient to cure the coating. The method can further comprise applying a pressure sensitive adhesive on the coated substrate after step (II).

By actinic radiation it is meant ultraviolet light, electron beam radiation, and alpha-, beta-, gamma- and x-rays. By heat it is meant infrared radiation, hot-air, or microwave radiation. Of course actinic radiation is frequently accompanied by heat and the use of a combination of the two falls within the scope and spirit of the present method. In this method of this invention, the application of the silicone release coating composition to the substrate can be accomplished by any suitable manner known in the art, such as by spreading, brushing, extruding, spraying, gravure, kiss-roll and air-knife.

In a preferred embodiment of the instant method, the solid substrate is a flexible sheet material such as paper, polyolefin film, polyolefin-coated paper, or foil. Other suitable solid substrates that can be coated by the method of this invention include other cellulosic materials such as wood, cardboard and cotton, metallic materials such as aluminum, copper, steel and silver, siliceous materials such as glass and stone, and synthetic polymer materials such as polyolefins, polyamides, polyesters and polyacrylates. As to the form of the solid substrate, it can be substantially sheet-like, such as a peelable release liner for pressure sensitive adhesive, a fabric or a foil, or substantially three-dimensional in form.

After the curable silicone release coating composition has been coated onto a substrate it is heated and/or irradiated with actinic radiation, as noted herein, to cure the liquid coating and to adhere it to the substrate.

In a preferred embodiment of the method of this invention, a flexible sheet material, such as paper, metal foil or tapestock, is coated with a thin coating of the liquid curable silicone release coating composition, preferably in a continuous manner and the thus-coated material is then heated and/or irradiated to rapidly cure the coating, to provide a sheetlike material bearing on at least one surface thereof an adhesive-releasing coating. The adhesive-releasing coating is subsequently brought into contact with a pressure sensitive adhesive, to form an article having a peelable, i.e. releasable, adhesive/coating interface. Examples of such an article include, adhesive labels having a peelable backing, adhesive tape in roll form and adhesive packaged in a strippable container. The pressure sensitive adhesive can be non-silicone-based, such as the well-known acrylic or rubber types or silicone-based, such as the peroxide- or platinum-curable polydiorganosiloxane-based adhesives.

The method of this invention is also applicable to adhesive materials, other than pressure sensitive adhesives. Examples of said adhesive materials include foods, asphalt and gum polymers.

EXAMPLES

All parts and percentages are on a weight basis and all measurements were obtained at 25° C. unless otherwise indicated.

The apparatus and testing procedures used for the results shown herein are as follows:

Viscosities were measured with a rotating spindle viscometer at 25° C. (1 centistoke (cS)=1 mm$^2$/s).

The no migration condition was determined by firmly adhering a common, pressure sensitive adhesive tape to the coating, removing the tape and folding the removed tape together, adhesive surfaces to each other. Absence of migration of the coating to the tape was indicated by noting that the doubled tape was as difficult to separate as unused tape which was doubled.

Cure time for a composition means the time interval required for the composition, when coated onto S2S kraft paper, at a thickness of about 1.6 g/m², to attain a no migration condition.

The silicone coating compositions were tested for Thin Film Bath life in the following manner. This test was run under typical laboratory conditions (about 20° C. with varying relative humidity) in a location free from significant air movement. The silicone coating was applied with a 0.005 inches (125 microns) gapped drawn-down device (i.e. BIRD bar) onto a clean piece of 0.002 inches (50 microns) thick polyester film. The area of the draw-down is approximately 3 inches×6 inches. The coating is then evaluated periodically (i.e. every 5 minutes) until it is tack-free in the center (i.e. the center of the film is no longer sticky or fluid). The time (in minutes) that this occurs is then recorded as the Thin-Film Bath Life.

The following materials were employed in preparing the compositions in the examples:

Organopolysiloxane A was a compound having the general formula $ViMe_2SiO(Me_2SiO)_a(MeViSiO)_bSiMe_2Vi$ having 2 mole % vinyl groups, having a degree of polymerization of about 160, and having a viscosity of about 350 mm²/s, wherein Me denotes methyl and Vi denotes vinyl (—CH═CH₂).

Organopolysiloxane B was a compound having the general formula $HexMe_2SiO(Me_2SiO)_a(MeHexSiO)_bSiMe_2Hex$ having 2 mole percent (%) hexenyl groups, having a degree of polymerization of about 100, and wherein Me denotes methyl and Hex denotes 5-hexenyl (—(CH₂)₄CH═CH₂).

Organohydrogensiloxane A was a trimethylsiloxy-endblocked-polydimethylsiloxane-methylhydrogensiloxane copolymer having a total average degree of polymerization of about 40 and about 70 mole % methylhydrogen moiety on the siloxane chain.

Catalyst A was a platinum catalyst (a soluble platinum complex containing about 0.50% platinum formed from chloroplatinic acid and divinyltetramethyldisiloxane).

Inhibitor A was prepared by adding about 150 grams (g) of diphenylmethylchlorosilane and about 59.9 (g) of picoline to a 3-neck flask equipped with a mechanical stirrer, thermometer, addition funnel, a nitrogen purge, and reflux condenser. This mixture was then stirred at room temperature under a nitrogen atmosphere. Next, about 54.2 (g) of methylbutynol was added dropwise to the flask over a 30 minute period which began a steady exotherm and a rise in temperature. After the addition of the acetylenic alcohol was complete, the mixture was allowed to react for an additional hour at about 60° C. The material was then transferred to a separatory funnel and was then water washed. The product layer was then decanted to a bottle and excess NaSO₄ was added to remove any residual water, and the material was then filtered. The product layer was then transferred to a flask and a distillation was performed to purify the product. ¹H and ¹³C NMR confirmed this compound to be a compound having the formula

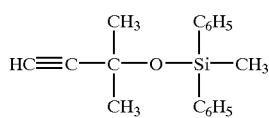

(diphenylmethyl(3-methyl-1-butyn-3-oxy)silane).

Inhibitor B was prepared in the same manner as Inhibitor A, except that 202 (g) of dimethylphenylchlorosilane, 136 (g) of picoline, and 101 (g) of methylbutynol were employed in the reaction. ¹H and ¹³C NMR confirmed this compound to be a compound having the formula

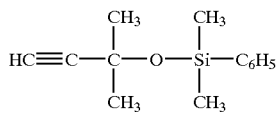

(dimethylphenyl(3-phenyl(3-methyl-1-butyn-3-oxy)silane).

Inhibitor C was prepared in the same manner as Inhibitor A, except that 197 (g) of dimethylhexenylchlorosilane, 107 (g) of picoline, and 97 (g) of methylbutynol were employed in the reaction. ¹H and ¹³C NMR confirmed this compound to be a compound having the formula

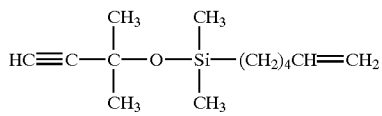

(dimethylhexenyl(3-methyl-1-butyn-3-oxy)silane).

Inhibitor D was prepared in the same manner as Inhibitor A, except that 200 (g) of dimethylvinylchlorosilane, 163 (g) of picoline, and 135 (g) of methylbutynol were employed in the reaction. ¹H and ¹³C NMR confirmed this compound to be a compound having the formula

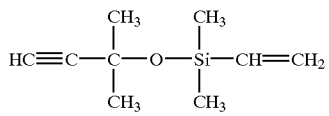

(dimethylvinyl (3-methyl-1-butyn-3-oxy) silane.

Inhibitor E was prepared in the same manner as Inhibitor A, except that 101.5 (g) of triethylchlorosilane, 63 (g) of picoline, and 58 (g) of methylbutynol were employed in the reaction. ¹H and ¹³C NMR confirmed this compound to be a compound having the formula

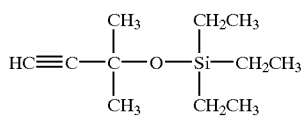

(triethyl(3-methyl-1-butyn-3-oxy)silane).

Inhibitor F was prepared in the same manner as Inhibitor A, except that 200 (g) of methyltrifluoropropyldichlorosilane, 177 (g) of picoline, and 160 (g) of methylbutynol were employed in the reaction. ¹H and ¹³C NMR confirmed this compound to be a compound having the formula

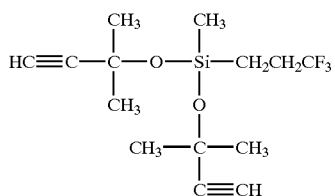

(methyltrifluoropropyl bis(3-methyl-1-butyn-3-oxy)silane).

Inhibitor G was prepared in the same manner as Inhibitor A, except that 221 (g) of methylbutynol and 245 (g) of picoline were added to the flask first, and then this was followed by the dropwise addition of 168 (g) of dimethyldichlorosilane. This compound was determined to be a compound having the formula

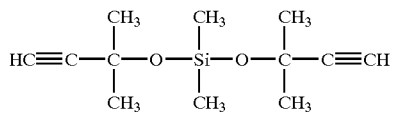

(dimethyl bis(3-methyl-1-butyn-3-oxy)silane).

Inhibitor H was prepared in the same manner as Inhibitor A, except that 171.1 (g) of trimethylchlorosilane, 147.4 (g) of picoline, and 200 (g) of 3,5-dimethyl-1-hexyn-3-ol were employed in the reaction. This compound was determined to be a compound having the formula

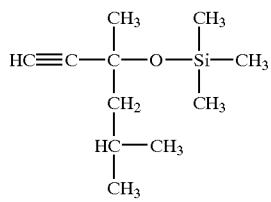

(trimethyl(3,5-dimethyl-1-hexyn-1-oxy)silane).

Inhibitor I was prepared in the same manner as Inhibitor A, except that 295.3 (g) of 3,5-dimethyl-1-hexyn-3-ol and 196.7 (g) of pyridine were added to the flask first, and then this was followed by the dropwise addition of 150 (g) of dimethyldichlorosilane. This compound was determined to be a compound having the formula

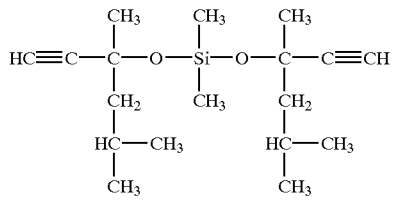

(dimethyl bis(3,5-dimethyl-1-hexyn-3-oxy)silane).

Inhibitor J was prepared in the same manner as Inhibitor A, except that 149.5 (g) of methyldiphenylchlorosilane, 60.5 (g) of picoline, and 93 (g) of phenylbutynol, were employed in the reaction. As phenylbutynol is solid at room temperature, a heat gun was used to keep it liquid during the addition phase. This compound was determined to be a compound having the formula

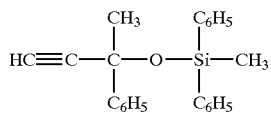

(diphenylmethyl(3-phenyl-1-butyn-3-oxy)silane).

Inhibitor K was prepared in the same manner as Inhibitor A, except that 113.3 (g) of dimethylphenylchlorosilane, 79.5 (g) of picoline, and 96.8 (g) of phenylbutynol, were employed in the reaction. A heat gun was again used to keep the phenylbutynol liquid during the addition phase. 1H and $^{13}C$ NMR confirmed this compound to be a compound having the formula

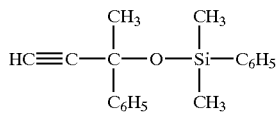

(dimethylphenyl(3-phenyl-1-butyn-3-oxy)silane).

Inhibitor L was prepared in the same manner as Inhibitor A, except that 120 (g) of dimethylhexenylchlorosilane, 65 (g) of picoline, and 98.5 (g) of phenylbutynol, were employed in the reaction. A heat gun was again used to keep the phenylbutynol liquid during the addition phase. 1H and $^{13}C$ NMR confirmed this compound to be a compound having the formula

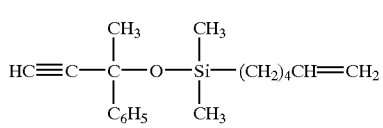

(dimethylhexenyl(3-phenyl-1-butyn-3-oxy)silane).

Inhibitor M was prepared in the same manner as Inhibitor A, except that 80 (g) of dimethylvinylchlorosilane, 65 (g) of picoline, and 95 (g) of phenylbutynol, were employed in the reaction. A heat gun was again used to keep the phenylbutynol liquid during the addition phase. $^{1}H$ and $^{13}C$ NMR confirmed this compound to be a compound having the formula

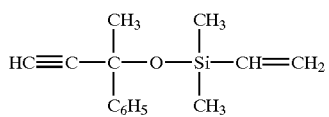

(dimethylvinyl(3-phenyl-1-butyn-3-oxy)silane).

Inhibitor N was prepared in the same manner as Inhibitor A, except that 188 (g) of diphenylmethylchlorosilane, 80 (g) of picoline, and 96.8 (g) of ethynylcyclohexanol, were employed in the reaction. $^{1}H$ and $^{13}C$ NMR confirmed this compound to be a compound having the formula

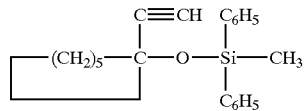

(diphenylmethyl(cyclohexyl-1-ethyn-1-oxy)silane).

Inhibitor O was prepared in the same manner as Inhibitor A, except that 138.5 (g) of dimethylhexenylchlorosilane, 87 (g) of picoline, and 96.3 (g) of ethynylcyclohexanol, were employed in the reaction. $^{1}H$ and $^{13}C$ NMR confirmed this compound to be a compound having the formula

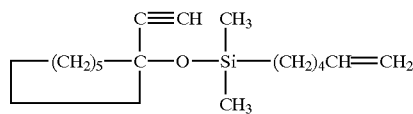

(dimethylhexenyl(cyclohexyl-1-ethyn-1-oxy)silane).

Inhibitor P was prepared in the same manner as Inhibitor A, except that 97 (g) of dimethylvinylchlorosilane, 76 (g) of picoline, and 96.8 (g) of ethynylcyclohexanol, were employed in the reaction. $^{1}H$ and $^{13}C$ NMR confirmed this compound to be a compound having the formula

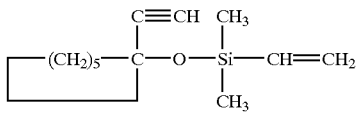

(dimethylvinyl(cyclohexyl-1-ethyn-1-oxy)silane).

Inhibitor Q was a compound having the formula

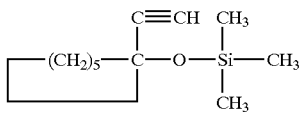

(trimethyl(cyclohexyl-1-ethyn-1-oxy)silane).

Inhibitor R was a compound having the formula

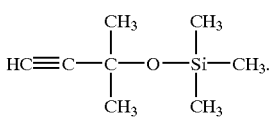

Inhibitor S was a compound having the formula

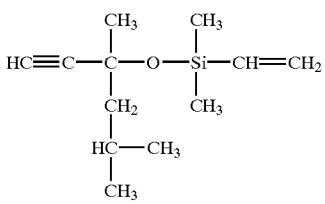

(dimethylvinyl(3,5-dimethyl-1-hexyn-3-oxy)silane).

Inhibitor T was a compound having the formula

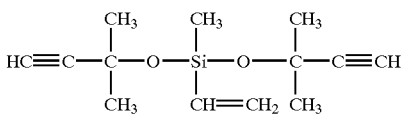

(vinylmethyl bis(3-methyl-1-butyn-3-oxy)silane).

Inhibitor U was a compound having the formula

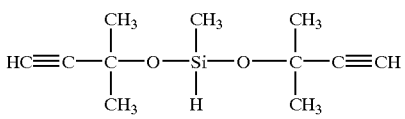

(methylhydrogen bis(3-methyl-1-butyn-3-oxy)silane).

Comparative Inhibitor (C.I.) A was 3,5-dimethyl-1-hexyn-3-ol.

Examples 1–13

A silicone release coating was prepared by mixing 382.2 grams (g) of Organopolysiloxane B and 17 (g) of Organohydrogensiloxane A in a 4 ounce jar. Next, to about 5 (g) of this mixture was added one the inhibitors delineated above and the resulting mixture was stirred until it was homogeneous. The type and amount of inhibitor added in (g) is delineated in Table 1 hereinbelow. Finally, with stirring, about 0.1 grams of Catalyst A was added to this mixture. The resulting mixture was then stirred until it was homogeneous. The resulting silicone coatings were then tested for cure time in seconds to no migration at 82.2° C. (180° F.) and thin film bath life (TFBL) as delineated above. The results are shown in Table 1 hereinbelow.

TABLE 1

| Example | Inhibitor | Inhibitor Amount (g) | Cure Time (sec.) | TFBL (min.) |
|---|---|---|---|---|
| 1 | (C.I.) A | 0.0286 | 14.4 | 18 |
| 2 | A | 0.0430 | 36.0 | 1080 |
| 3 | B | 0.0357 | 6.5 | >150 |
| 4 | C | 0.0341 | 8.0 | >120 |
| 5 | D | 0.0280 | 4.2 | 14 |
| 6 | E | 0.0333 | 3.8 | >90 |
| 7 | F | 0.0274 | 14.4 | >60 |
| 8 | K | 0.0462 | 24.0 | 300 |
| 9 | L | 0.0437 | 36.0 | 246 |
| 10 | M | 0.0283 | 18.0 | 366 |
| 11 | N | 0.0506 | >36 | 354 |
| 12 | O | 0.0485 | 24.0 | 168 |
| 13 | P | 0.0328 | 8.0 | 150 |

Examples 14–26

A silicone release coating was prepared by mixing 382.2 (g) of Organopolysiloxane B and 17 (g) of ohydrogensiloxane A in a 4 ounce jar. Next, to about 5 (g) of this mixture was added one the inhibitors delineated above and the resulting mixture was stirred until it was homogeneous. The type and amount of inhibitor added in (g) is delineated in Table 2 hereinbelow. Finally, with stirring, about 0.1 grams of Catalyst A was added to this mixture. The resulting mixture was then stirred until it was homogeneous. The resulting silicone coatings were then tested for cure time in seconds to no migration at 110° C. (230° F.) as delineated above. The results are shown in Table 2 hereinbelow.

TABLE 2

| Example | Inhibitor | Inhibitor Amount (g) | Cure Time (sec.) |
|---|---|---|---|
| 14 | (C.I.) A | 0.0191 | 5.1 |
| 15 | A | 0.0435 | 10.3 |
| 16 | B | 0.0328 | 3.0 |
| 17 | C | 0.0350 | 2.5 |
| 18 | D | 0.0250 | 1.6 |
| 19 | E | 0.0336 | 1.8 |
| 20 | F | 0.0221 | 4.2 |
| 21 | K | 0.0438 | 6.5 |
| 22 | L | 0.0443 | 7.2 |
| 23 | M | 0.0246 | 4.8 |
| 24 | N | 0.0496 | 14.4 |
| 25 | O | 0.0409 | 3.8 |
| 26 | P | 0.0319 | 2.4 |

Examples 27–39

A silicone release coating was prepared by mixing 382.2 grams (g) of Organopolysiloxane B and 17 (g) of Organohydrogensiloxane A in a 4 ounce jar. Next, to about 100 (g) of this mixture was added one the inhibitors delineated above and the resulting mixture was stirred until it was homogeneous. The type and amount of inhibitor added in (g) is delineated in Table 3 hereinbelow. Finally, with stirring, about 0.1 grams of Catalyst A was added to this mixture. The resulting mixture was then stirred until it was homogeneous. The viscosity of the resulting silicone coatings was then measured on a rotating spindle viscometer on an hourly basis. The viscosity is reported in millipascal-seconds (mPa·s) (1 millipascal-second=1 centipoise) and was measured at 40° C. Viscosity values which reached 0.5 or above were rounded to the next highest whole number. The results are shown in Table 3 hereinbelow.

TABLE 3

| Example | Inhibitor | Inhibitor Amount (g) | Time (hours) | | | | | | | | | | | | | | | | |
|---|---|---|---|---|---|---|---|---|---|---|---|---|---|---|---|---|---|---|---|
| | | | 0 | 1 | 2 | 3 | 4 | 5 | 6 | 7 | 8 | 22 | 24 | 25 | 26 | 27 | 28 | 47 | 48 |
| 27 | (C.I.) A | 1.31 | 203 | 203 | 178 | 180 | 195 | 195 | 195 | 205 | | | 208 | 210 | 210 | 203 | 208 | 270 | 190 |
| 28 | A | 2.95 | 213 | 203 | 215 | 228 | 243 | 268 | 278 | 293 | | | gel | | | | | | |
| 29 | B | 2.27 | 185 | 200 | 218 | 250 | 270 | 280 | 308 | 308 | | | | | | | | | |
| 30 | C | 2.33 | 220 | 280 | 488 | gel | | | | | | | | | | | | | |
| 31 | D | 1.76 | 193 | 210 | 228 | 255 | 273 | 343 | 363 | 440 | 450 | 1213 | gel(23) | | | | | | |
| 32 | E | 2.06 | 220 | 238 | 293 | 340 | 380 | 723 | 1670 | gel | | | | | | | | | |
| 33 | F | 1.59 | 288 | 308 | 328 | 328 | 333 | 333 | 333 | 335 | 353 | | gel | | | | | | |
| 34 | K | 2.93 | 320 | 403 | 505 | 795 | gel | | | | | | | | | | | | |
| 35 | L | 2.97 | 300 | 348 | 425 | 443 | 713 | gel | | | | | | | | | | | |
| 36 | M | 1.60 | 275 | 283 | 318 | 320 | 320 | 320 | 325 | 340 | | 558 | | 623 | | | gel(30) | | |
| 37 | N | 3.34 | 355 | 403 | 520 | 1518 | gel | | | | | | | | | | | | |
| 38 | O | 2.74 | 473 | gel | | | | | | | | | | | | | | | |
| 39 | P | 2.16 | 300 | 363 | 393 | 818 | 933 | 1193 | 1338 | gel | | | | | | | | | |

Examples 40–42

Silicone release coatings were prepared by mixing 10 grams (g) of Organopolysiloxane B and 0.45 (g) of Organohydrogensiloxane A in a 4 ounce jar. Next, to this mixture was added one the inhibitors delineated above and the resulting mixture was stirred until it was homogeneous. The type and amount of inhibitor added in (g) is delineated in Table 4 hereinbelow. Finally, with stirring, about 0.19 grams of Catalyst A was added to this mixture. The resulting mixture was then stirred until it was homogeneous. The resulting silicone coatings were then tested for cure temperature at a 10 second dwell time. The coatings were cured to no migration as delineated above. The temperature at which the silicone coatings cured is shown in Table 4 hereinbelow.

A comparison silicone coating (1) was prepared by mixing 10 (g) of Organopolysiloxane B, 0.095 (g) of diethyl fumarate, 0.04 (g) of benzyl alcohol, and 0.19 (g) of Catalyst A in a 4 ounce jar. Next, 0.45 (g) of Organohydrogensiloxane A was added to this mixture, and the mixture was stirred until it was homogeneous.

A second comparison silicone coating (2) was prepared by mixing 10 (g) of Organopolysiloxane B, 0.08 (g) of bis(2-methoxy-1-methylethyl) maleate, and 0.19 (g) of Catalyst A in a 4 ounce jar. Next, 0.45 (g) of Organohydrogensiloxane A was added to this mixture, and the mixture was stirred until it was homogeneous. Both of the comparison silicone coatings were then tested for cure temperature at a 10 second dwell time. The coatings were cured to no migration as delineated above. The temperature at which the comparison silicone coatings cured is also shown in Table 4 hereinbelow.

TABLE 4

| Example | Inhibitor | Inhibitor Amount (g) | Cure Temp. (° C.) |
|---|---|---|---|
| 40 | (C.I.) A | 0.03 | 104.4 |
| 41 | E | 0.20 | 71.1 |
| 42 | R | 0.20 | 73.9 |
| Compar. Coating | | | |
| (1) | | | 82.2 |
| (2) | | | 126.7 |

Examples 43–46

Silicone release coatings were prepared by mixing 97.29 (g) of Organopolysiloxane B and 4.57 (g) of Organohydrogensiloxane A in a 4 ounce jar. Next, to this mixture was added one the inhibitors delineated above and the resulting mixture was stirred until it was homogeneous. The type and amount of inhibitor added in (g) is delineated in Table 5 hereinbelow. Finally, with stirring, about 1.9 grams of Catalyst A was added to this mixture. The resulting mixture was then stirred until it was homogeneous. The resulting silicone coatings were then tested for cure temperature at a 10 second dwell time. The coatings were cured to no migration as delineated above. The temperature at which the silicone coatings cured is shown in Table 5 hereinbelow.

TABLE 5

| Example | Inhibitor | Inhibitor Amount (g) | Cure Temp. (° C.) |
|---|---|---|---|
| 43 | H | 2.5 | 71.1 |
| 44 | S | 2.7 | 76.7 |
| 45 | G | 0.15 | 87.8 |
| 46 | T | 0.3 | 82.2 |

Example 47

Silicone release coatings were prepared by mixing 100 (g) of Organopolysiloxane B and 4.36 (g) of Organohydrogensiloxane A in a 4 ounce jar. Next, to this mixture was added varying amounts of inhibitor H delineated above and the resulting mixture was stirred until it was homogeneous. The amount of inhibitor H added in (g) is delineated in Table 6 hereinbelow. Finally, with stirring, about 1.9 grams of Catalyst A was added to this mixture. The resulting mixture was then stirred until it was homogeneous. The resulting silicone coatings were then tested for cure time in seconds to no migration at 82.2° C. (180° F.), thin film bath life (TFBL), viscosity, and cure temperature at a 10 second dwell time as described above. The results of the tests are shown in Table 6 hereinbelow.

TABLE 6

| Example | Inhibitor H Amount (g) | Time/viscosity at 40° C. (hr)/(mPa · s) | | TFBL (min.) | Cure Time (sec.) | Cure Temp. (° C.) |
|---|---|---|---|---|---|---|
| 47A | 0.4 | 0 | gel | 25 | — | — |
| 47B | 1.0 | 0 | 360 | 55 | 6.5 | 65.6 |
|  |  | 1 | gel |  |  |  |
| 47C | 2.0 | 0 | 260 | 70 | 7.2 | 68.3 |
|  |  | 1 | 375 |  |  |  |
|  |  | 2 | gel |  |  |  |
| 47D | 3.0 | 0 | 217 | 80 | 8.0 | — |
|  |  | 1 | 287 |  |  |  |
|  |  | 2 | 395 |  |  |  |
|  |  | 3 | 565 |  |  |  |
|  |  | 4 | 1900 |  |  |  |

Examples 48–53

A silicone release coating was prepared by mixing 97.29 grams (g) of Organopolysiloxane B and 4.57 (g) of Organohydrogensiloxane A in a 4 ounce jar. Next, to this mixture was added one the inhibitors delineated above and the resulting mixture was stirred until it was homogeneous. The type and amount of inhibitor added in (g) is delineated in Table 7 hereinbelow. Finally, with stirring, about 1.9 grams of Catalyst A was added to this mixture. The resulting mixture was then stirred until it was homogeneous. The resulting silicone coatings were then tested for cure time in seconds to no migration at 82.2° C. (180° F.) and thin film bath life (TFBL) as delineated above. The results are shown in Table 7 hereinbelow.

TABLE 7

| Example | Inhibitor | Inhibitor Amount (g) | Cure Time (sec.) | TFBL (min.) |
|---|---|---|---|---|
| 48 | G | 0.15 | 9.0 | 105 |
| 49 | H | 2.5 | 4.2 | 37 |
| 50 | T | 0.3 | 10.3 | >120 |
| 51 | E | 2.5 | 6.5 | 102 |
| 52 | R | 2.0 | 4.8 | 16 |

Examples 53–56

A silicone release coating was prepared by mixing 97.29 grams (g) of Organopolysiloxane B and 4.57 (g) of Organohydrogensiloxane A in a 4 ounce jar. Next, to this mixture was added one the inhibitors delineated above and the resulting mixture was stirred until it was homogeneous. The type and amount of inhibitor added in (g) is delineated in Table 8 hereinbelow. Finally, with stirring, about 1.9 grams of Catalyst A was added to this mixture. The resulting mixture was then stirred until it was homogeneous. The viscosity of the resulting silicone coatings was then measured as described hereinabove. The results are shown in Table 8 hereinbelow.

TABLE 8

| Example | Inhibitor | Amount (g) | Time (hours) | | | |
|---|---|---|---|---|---|---|
|  |  |  | 0 | 1 | 2 | 3 |
| 53 | H | 2.50 | 215 | 593 | 1898 | gel |
| 54 | G | 0.15 | 245 | 348 | 660 | gel |
| 55 | T | 0.30 | 233 | 643 | gel |  |
| 56 | R | 2.00 | 195 | 297 | 523 | gel |

Example 57

Silicone release coatings were prepared by mixing 97.29 (g) of Organopolysiloxane B and 4.57 (g) of Organohydrogensiloxane A in a 4 ounce jar. Next, to this mixture was added varying amounts of inhibitor U delineated above and the resulting mixture was stirred until it was homogeneous. The amount of inhibitor U added in (g) is delineated in Table 9 hereinbelow. Finally, with stirring, about 1.9 grams of Catalyst A was added to this mixture. The resulting mixture was then stirred until it was homogeneous. The resulting silicone coatings were then tested for cure time in seconds to no migration at 82.2° C. (180° F.), thin film bath life (TFBL), and viscosity as described above. The results of the tests are shown in Table 9 hereinbelow.

TABLE 9

| Example | Inhibitor U Amount (g) | Time/viscosity at 40° C. (hr)/(mPa · s) | | TFBL (min.) | Cure Time (sec.) |
|---|---|---|---|---|---|
| 57A | 0.15 | 0 | gel | 60 | 9.0 |
| 57B | 0.30 | 2 | gel | 130 | 18.0 |
| 57C | 0.45 | 0 | 210 | 160 | 24.0 |
|  |  | 1 | 285 |  |  |
|  |  | 2 | gel |  |  |

Example 58

A silicone release coating was prepared by mixing 20 grams (g) of Organopolysiloxane B and 1.14 (g) of Organohydrogensiloxane A in a 4 ounce jar. Next, to this mixture was added 0.24 (g) of inhibitor Q delineated above and the resulting mixture was stirred until it was homogeneous. Finally, with stirring, about 0.38 grams of Catalyst A was added to this mixture. The resulting mixture was then stirred until it was homogeneous. The resulting silicone coating was then tested for cure time in seconds to no migration, as defined above, at 82.2° C. (180° F.). The cure time of this silicone release coating was 9.0 seconds.

Example 59

A silicone release coating of the invention was prepared by mixing 10 grams (g) of Organopolysiloxane B and 0.57 (g) of Organohydrogensiloxane A in a 4 ounce jar. Next, to this mixture was added 0.12 (g) of inhibitor H delineated above and the resulting mixture was stirred until it was homogeneous. Finally, with stirring, about 0.19 grams of Catalyst A was added to this mixture. The resulting mixture was then stirred until it was homogeneous. The resulting silicone coating was then tested for cure temperature at a 10 second dwell time. The coating was cured to no migration as delineated above. The temperature at which the silicone coating cured is shown in Table 10 hereinbelow.

A comparison silicone release coating was prepared by mixing 10 grams (g) of Organopolysiloxane A and 0.61 (g)

of Organohydrogensiloxane A in a 4 ounce jar. Next, to this mixture was added 0.12 (g) of inhibitor H delineated above and the resulting mixture was stirred until it was homogeneous. Finally, with stirring, about 0.19 grams of Catalyst A was added to this mixture. The resulting mixture was then stirred until it was homogeneous. The resulting comparison silicone coating was then tested for cure temperature at a 10 second dwell time. The coating was cured to no migration as delineated above. The temperature at which the silicone coating cured is shown in Table 10 hereinbelow.

TABLE 10

|  | Cure Temp. (° C.) |
|---|---|
| Example 59 | 65.6 |
| Compar. Ex. | 107.2 |

Thus it clear from the above data, that silicone release coatings containing organopolysiloxanes having higher alkenyl groups (organopolysiloxane B) in combination with the silylated inhibitors cure at far lower temperatures that do silicone release coatings containing organopolysiloxanes having vinyl groups (Organopolysiloxane A) in combination with silylated inhibitors.

That which is claimed is:

1. A method of making a curable silicone release coating composition comprising:

(I) mixing:
        (A) an organopolysiloxane compound having its formula selected from the group consisting of:
            (i) $R^1_3SiO(R_2SiO)_x(RR^1SiO)_ySiR^1_3$,
            (ii) $R^1_3SiO(R_2SiO)_xSiR^1_3$, and
            (iii) $R^1_3SiO(RR^1SiO)_ySiR^1_3$,
            wherein R is independently selected from monovalent hydrocarbon or halohydrocarbon radicals free of aliphatic unsaturation and having from 1 to 20 carbon atoms, $R^1$ is independently selected from the group consisting of R and vinyl, x has a value of from greater than zero to 7000, and y has a value of from greater than zero to 350 with the proviso that there are at least vinyl groups per compound;
        (B) an organohydrogensilicon compound;
        (C) a platinum group metal-containing catalyst;
        (D) a silylated acetylenic compound having its formula selected from the group consisting of:

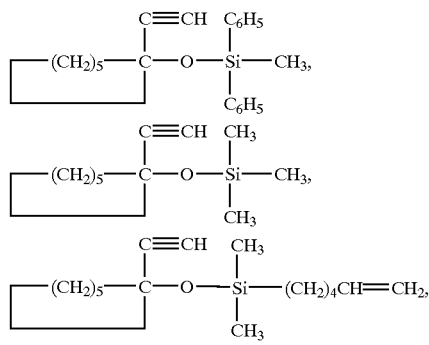

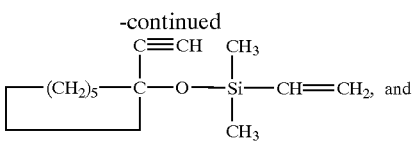

optionally (E) a diluent.

2. A method according to claim 1, wherein (A) is selected from the group consisting of $ViMe_2SiO(Me_2SiO)_xSiMe_2Vi$, $Me_3SiO(Me_2SiO)_x(MeViSiO)_ySiMe_3$, $Me_3SiO(MeViSiO)_ySiMe_3$, $ViMe_2SiO(Me_2SiO)_x(MeViSiO)_ySiMe_2Vi$, and $ViMe_2SiO(MeViSiO)_ySiMe_2Vi$ wherein Me and Vi denote methyl and vinyl, respectively, x has a value of from greater than zero to 7000, and y has a value of from greater than zero to 350.

3. A method according to claim 1, wherein (B) is selected from the group consisting of bis(trimethylsiloxy)dimethyldihydrogendisiloxane, heptamethylhydrogentrisiloxane, hexamethyldihydrogentrisiloxane, methylhydrogencyclosiloxanes, pentamethylpentahydrogencyclopentasiloxane, pentamethylhydrogendisiloxane, polymethylhydrogensiloxanes, tetramethyltetrahydrogencyclotetrasiloxane, tetramethyldihydrogendisiloxane, and methylhydrogensiloxane-dimethylsiloxane copolymers.

4. A method according to claim 1, wherein (B) is a compound having its formula selected from the group consisting of $HMe_2SiO(Me_2SiO)_a(MeHSiO)_bSiMe_2H$, $HMe_2SiO(Me_2SiO)_aSiMe_2H$, $Me_3SiO(Me_2SiO)_a(MeHSiO)_bSiMe_3$, $HMe_2SiO(MeHSiO)_bSiMe_2H$, and $Me_3SiO(MeHSiO)_bSiMe_3$ wherein Me denotes methyl wherein a has a value of from greater than zero to 1000 and b has a value of from greater than zero to 200.

5. A method according to claim 1, wherein (C) is selected from the group consisting of chloroplatinic acid and chloroplatinic acid-divinyltetramethyldisiloxane complexes.

6. A method according to claim 1, wherein (E) is selected from the group consisting of pentane, hexane, heptane, octane, nonane, benzene, toluene, xylene, acetone, methylethyl ketone, methylisobutyl ketone, trichloroethane, perchloroethylene, and bromobenzene.

7. A curable silicone release coating produced in accordance with the method of claim 1.

8. A curable silicone release coating produced in accordance with the method of claim 2.

9. A method of making a coated article, the method comprising:

(I) applying a curable silicone coating composition on the surface of a substrate wherein the coating composition is obtained by a method comprising mixing:
        (A) an organopolysiloxane compound having its formula selected from the group consisting of:
            (i) $R^1_3SiO(R_2SiO)_x(RR^1SiO)_ySiR^1_3$,
            (ii) $R^1_3SiO(R_2SiO)_xSiR^1_3$, and
            (iii) $R^1_3SiO(RR^1SiO)_ySiR^1_3$,
            wherein R is independently selected from monovalent hydrocarbon or halohydrocarbon radicals free of aliphatic unsaturation and having from 1 to 20 carbon atoms, $R^1$ is independently selected from the group consisting of R and vinyl, x has a value of from greater than zero to 7000, and y has a value of from greater than zero to 350 with the proviso that there are at least two vinyl groups per compound;

(B) an organohydrogensilicon compound;
(C) a platinum group metal-containing catalyst;
(D) a silylated acetylenic compound having its formula selected from the group consisting of:

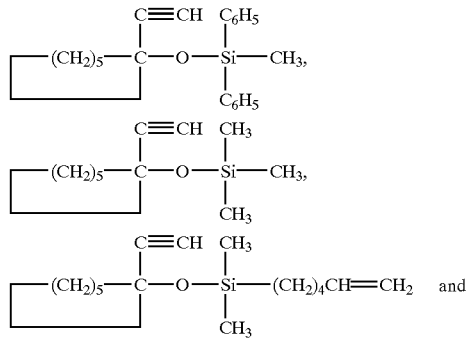

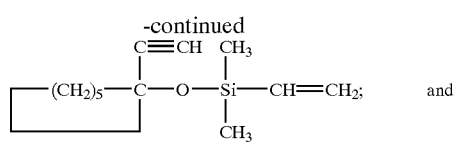

optionally (E) a diluent; and (II) exposing the coating and the substrate to an energy source selected from the group consisting of (i) heat and (ii) actinic radiation in an amount sufficient to cure the coating.

10. A coated article according to claim 9, wherein the method further comprises applying a pressure sensitive adhesive on the coated substrate after step (II).

11. A coated article produced in accordance with the method of claim 9.

12. A coated article produced in accordance with the method of claim 10.

* * * * *